United States Patent
Takeuchi et al.

(10) Patent No.: US 7,825,063 B2
(45) Date of Patent: Nov. 2, 2010

(54) HYDROGEN SULFIDE GENERATION-SUPPRESSED CATALYST

(75) Inventors: Masashi Takeuchi, Kakegawa (JP); Hirotaka Ori, Kakegawa (JP)

(73) Assignee: Cataler Corporation, Kakegawa-shi, Shizuoka-ken (JP)

( * ) Notice: Subject to any disclaimer, the term of this patent is extended or adjusted under 35 U.S.C. 154(b) by 716 days.

(21) Appl. No.: 11/405,956

(22) Filed: Apr. 17, 2006

(65) Prior Publication Data

US 2006/0247126 A1 Nov. 2, 2006

(30) Foreign Application Priority Data

May 2, 2005 (JP) ............................. 2005-134208

(51) Int. Cl.
- B01J 23/00 (2006.01)
- B01J 21/00 (2006.01)
- B01J 20/00 (2006.01)
- B01J 29/00 (2006.01)
- B01J 37/00 (2006.01)

(52) U.S. Cl. ................ 502/302; 502/304; 502/327; 502/332; 502/333; 502/334; 502/339; 502/355; 502/415; 502/439

(58) Field of Classification Search ............... 502/302, 502/303, 304, 327, 332, 333, 334, 339, 355, 502/415, 439

See application file for complete search history.

(56) References Cited

U.S. PATENT DOCUMENTS

| | | | | |
|---|---|---|---|---|
| 4,528,279 A | * | 7/1985 | Suzuki et al. | 502/200 |
| 4,985,211 A | * | 1/1991 | Akiyama et al. | 422/171 |
| 5,001,103 A | * | 3/1991 | Koberstein et al. | 502/262 |
| 5,010,051 A | * | 4/1991 | Rudy | 502/304 |
| 5,013,705 A | * | 5/1991 | Koberstein et al. | 502/262 |
| 5,801,114 A | * | 9/1998 | Durand et al. | 502/302 |
| 5,849,659 A | * | 12/1998 | Tanaka et al. | 502/324 |
| 5,894,013 A | * | 4/1999 | Takada | 422/177 |
| 5,976,476 A | | 11/1999 | Blanchard et al. | |
| 6,060,420 A | * | 5/2000 | Munakata et al. | 502/302 |
| 6,087,298 A | * | 7/2000 | Sung et al. | 502/333 |
| 6,395,675 B1 | * | 5/2002 | Suga et al. | 502/326 |
| 6,423,293 B1 | * | 7/2002 | Chun et al. | 423/579 |
| 6,440,378 B1 | * | 8/2002 | Hirata et al. | 423/239.1 |
| 6,620,762 B2 | * | 9/2003 | Tan et al. | 502/304 |
| 6,634,168 B1 | * | 10/2003 | Yamamoto | 60/285 |
| 6,764,665 B2 | * | 7/2004 | Deeba et al. | 423/239.1 |
| 6,808,687 B1 | * | 10/2004 | Uenishi et al. | 422/177 |
| 6,864,214 B2 | * | 3/2005 | Uenishi et al. | 502/304 |
| 6,953,769 B2 | * | 10/2005 | Yamada et al. | 502/302 |
| 7,169,734 B2 | * | 1/2007 | Nakamura et al. | 502/302 |

(Continued)

FOREIGN PATENT DOCUMENTS

JP 63-240949 A 10/1988

(Continued)

OTHER PUBLICATIONS

Notice of Reasons for Rejection mailed Aug. 17, 2010, for JP Application No. 2005-134208, with English Translation, seven pages.

Primary Examiner—Cam N Nguyen
(74) Attorney, Agent, or Firm—Morrison & Foerster LLP (57) ABSTRACT

An exhaust gas-purifying catalyst includes Nd and/or Pr as an active ingredient that suppresses generation of hydrogen sulfide.

13 Claims, 4 Drawing Sheets

U.S. PATENT DOCUMENTS

| | | | |
|---|---|---|---|
| 7,276,212 B2 * | 10/2007 | Hu et al. | 422/177 |
| 7,341,975 B2 * | 3/2008 | Iwakuni et al. | 502/326 |
| 7,442,346 B2 * | 10/2008 | Ikeda et al. | 422/171 |
| 2001/0012502 A1 * | 8/2001 | Okumura et al. | 423/213.5 |
| 2001/0016554 A1 * | 8/2001 | Takeuchi | 502/303 |
| 2002/0031452 A1 * | 3/2002 | Okamoto et al. | 422/168 |
| 2002/0032124 A1 * | 3/2002 | Tan et al. | 502/304 |
| 2002/0039964 A1 * | 4/2002 | Tanaka et al. | 502/304 |
| 2002/0042342 A1 * | 4/2002 | Mussmann et al. | 502/304 |
| 2002/0081255 A1 * | 6/2002 | Cutler et al. | 423/213.5 |
| 2002/0091064 A1 * | 7/2002 | Nakamura et al. | 502/302 |
| 2002/0160912 A1 * | 10/2002 | Morikawa et al. | 502/303 |
| 2002/0187893 A1 * | 12/2002 | Yamada et al. | 502/304 |
| 2003/0021745 A1 * | 1/2003 | Chen | 423/239.1 |
| 2003/0100447 A1 * | 5/2003 | Deeba et al. | 502/339 |
| 2004/0001782 A1 * | 1/2004 | Kumar et al. | 422/180 |
| 2004/0048740 A1 * | 3/2004 | Summers | 502/302 |
| 2004/0209770 A1 * | 10/2004 | Nakatsuji | 502/302 |
| 2004/0235651 A1 * | 11/2004 | Uenishi et al. | 502/304 |
| 2005/0119120 A1 * | 6/2005 | Iwakuni et al. | 502/304 |
| 2005/0233897 A1 * | 10/2005 | Tanaka et al. | 502/302 |
| 2005/0255992 A1 * | 11/2005 | Strehlau et al. | 502/302 |
| 2006/0105908 A1 * | 5/2006 | Miyake et al. | 502/304 |

FOREIGN PATENT DOCUMENTS

| | | |
|---|---|---|
| JP | 63-310637 | 12/1988 |
| JP | 8-290063 | 11/1996 |
| JP | 10-505786 A | 6/1998 |
| JP | 2004-122122 A | 4/2004 |
| WO | WO-89/11906 | 12/1989 |

\* cited by examiner

HYDROGEN SULFIDE GENERATION-SUPPRESSED CATALYST

CROSS-REFERENCE TO RELATED APPLICATIONS

This application is based upon and claims the benefit of priority from prior Japanese Patent Application No. 2005-134208, filed May 2, 2005, the entire contents of which are incorporated herein by reference.

BACKGROUND OF THE INVENTION

1. Field of the Invention

The present invention relates to a hydrogen sulfide generation-suppressed catalyst.

2. Description of the Related Art

Various catalysts are conventionally used to purify exhaust gas of automobiles. An example of widely used exhaust gas-purifying catalysts is a three-way catalyst, which is made of a precious metal such as platinum and an inorganic oxide such as ceria or alumina that supports the precious metal. However, since automotive fuels contain sulfur (S), hydrogen sulfide ($H_2S$) is generated due to catalytic reaction when the catalyst is exposed to a reducing atmosphere. For this reason, the catalyst has a drawback of emitting an offensive odor.

A solution to this is proposed in Jpn. Pat. Appln. KOKAI Publication No. 63-310637, which describes a reduction of $H_2S$ emission by adding nickel (Ni) to the catalyst. Another solution is proposed in Jpn. Pat. Appln. KOKAI Publication No. 8-290063, which discloses an exhaust gas-purifying catalyst containing nickel oxide.

However, at present, in several countries especially in Europe, Ni and Ni compounds are designated as materials that load on the environment and the use of Ni or a Ni compound in a catalyst is prohibited. Under the circumstances, there is a demand for means that can reduce $H_2S$ emission without using Ni and significantly deteriorating the exhaust gas-purifying ability.

BRIEF SUMMARY OF THE INVENTION

An object of the present invention is to provide a catalyst that can reduce $H_2S$ emission without using Ni when a three-way catalytic component containing a precious metal is used.

According to an aspect of the present invention, there is provided an exhaust gas-purifying catalyst comprising at least one rare-earth element selected from the group consisting of Nd and Pr as an active ingredient that suppresses generation of hydrogen sulfide.

DETAILED DESCRIPTION OF THE INVENTION

Embodiments of the hydrogen sulfide generation-suppressed catalyst according to the present invention will now be described in detail.

Each catalyst according to the embodiments of the present invention contains at least one rare-earth element selected from the group consisting of neodymium (Nd) and praseodymium (Pr), as an active ingredient for inhibiting generation of hydrogen sulfide ($H_2S$). The mechanism that Nd and Pr inhibit the generation of $H_2S$ is assumed to be as follows.

An automotive fuel contains sulfur (S). Therefore, exhaust gases of automobiles contain sulfur dioxide ($SO_2$). When a three-way catalyst for purifying the exhaust gas adsorbs $SO_2$, and the catalyst is exposed to a reducing atmosphere containing a large amount of hydrocarbon (HC), $SO_2$ and $H_2$ react with each other to produce $H_2S$. Nickel adsorbs $H_2S$ thus produced, and therefore, $H_2S$ emission is suppressed. In contrast, Nd and Pr are considered to trap $SO_2$. Consequently, the reaction between $SO_2$ and $H_2$ is inhibited, and therefore, $H_2S$ emission is suppressed.

In each embodiment of the present invention, the active ingredient may be supported by a porous support such as alumina or ceria. In order to reduce CO, HC and $NO_x$ in an exhaust gas, it is preferable that the catalyst includes a three-way catalytic component that contains at least one precious metal such as Pt, Rh or Pd. The catalyst may be supported by a substrate made of heat-resistant porous ceramics such as cordierite. An example of the substrate is a monolith honeycomb substrate. When the catalyst contains a three-way catalytic component, the active ingredient and the three-way catalytic component may be mixed together. Alternatively, the active ingredient and the three-way catalytic component may be separately supported by the substrate. For example, the three-way catalytic component and the active ingredient may be supported by upstream and downstream sections of the substrate, respectively. In either case, the active ingredient does not significantly lower the exhaust gas-purifying ability of the three-way catalytic component.

The catalysts according to first to third embodiments of the present invention will now be described.

Figure 1:
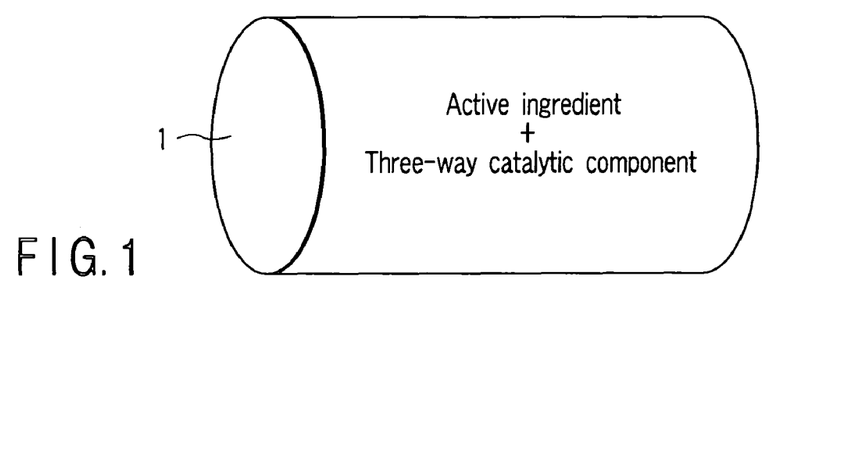
FIG. 1 is a schematic diagram illustrating a catalyst according to the first embodiment of the present invention.
Figure 2:
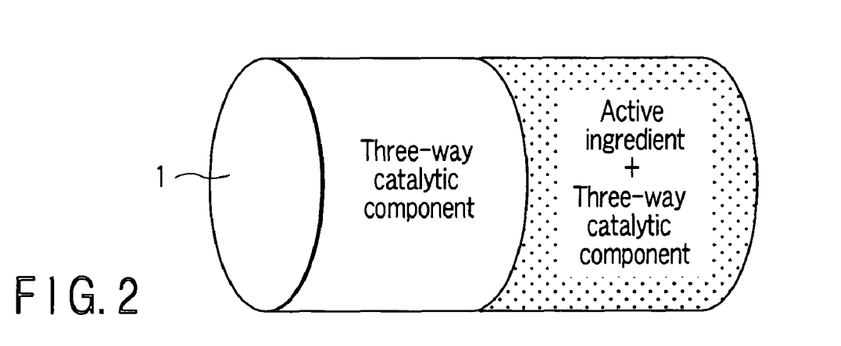
FIG. 2 is a schematic diagram illustrating a catalyst according to the second embodiment of the present invention.
Figure 3:
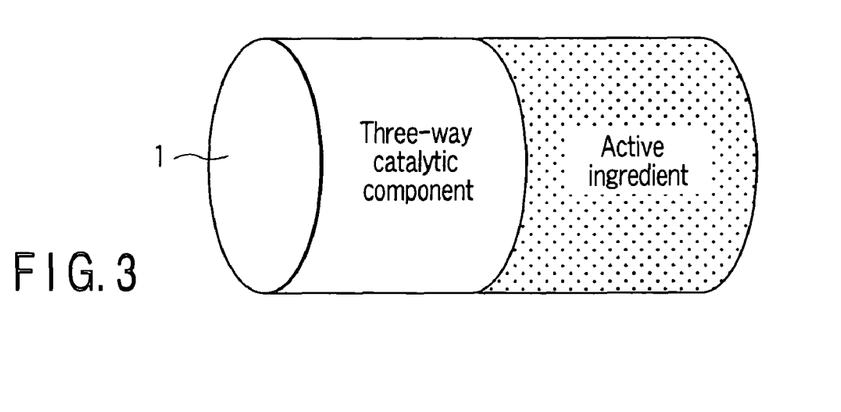
FIG. 3 is a schematic diagram illustrating a catalyst according to the third embodiment of the present invention.

FIG. 1 illustrates a catalyst according to the first embodiment in which a washcoat containing the active ingredient and three-way catalytic component is applied to a substrate 1. FIG. 2 illustrates a catalyst according to the second embodiment in which a washcoat containing the three-way catalytic component is applied to an upstream section of a substrate 1, and a washcoat containing the active ingredient and three-way catalytic component is applied to a downstream section of the substrate 1. FIG. 3 illustrates a catalyst according to the third embodiment in which a washcoat containing the three-way catalytic component is applied to an upstream section of a substrate 1, and a washcoat containing the active ingredient is applied to a downstream section of the substrate 1. In terms of the amount of the active ingredient usage, the second and third embodiments are preferable, and the third embodiment is particularly preferable. Although, each of FIGS. 1 to 3 illustrates the case where the catalyst is supported by a substrate having a cylindrical shape, the substrate may have other shapes.

It is preferable that the active ingredient is in the form of powder made of a water-insoluble solid compound of the above-mentioned rare-earth element, that is, Nd and/or Pr. In this case, Nd and Pr do not easily produce undesired compounds such as aluminate, when the water-insoluble solid compound powder is heated to high temperature. Therefore, when the water-insoluble solid compound powder is used, the thermal degradation of the catalyst can be suppressed.

Examples of the water-insoluble solid compound include an oxide, sulfide, carbonate, oxalate and fluoride of the above-mentioned rare-earth element, and a composite oxide containing the above-mentioned rare-earth element as a main component. It is preferable that the composite oxide contains 30 to 80% by mass of the rare-earth element. If the content of the rare-earth element exceeds 80% by mass, undesired compounds may be prone to be produced when the catalyst is heated to high temperature. If the content of the rare-earth element is lower than 30% by mass, the effect of suppressing generation of $H_2S$ may be deficient.

In the case where the rare-earth element is Nd, examples of its oxide include $Nd_2O_3$ and $Nd_4O_7$. Examples of its composite oxide include $Nd_2Zr_2O_7$ and $NdFeO_3$. In the case where the rare-earth element is Pr, examples of its oxide include $Pr_6O_{11}$ and $Pr_2O_3$. Examples of its composite oxide include $Pr_2Zr_2O_7$ and $PrTiO_3$. It is possible to use only one of these oxides and composite oxides. Alternatively, two or more of these oxides and composite oxides can be used in combination.

Preferably, each catalyst according to the embodiments of the present invention contains 2.5 to 11% by mass of the active ingredient. When the content of the active ingredient is lower than 2.5% by mass, the active ingredient may insufficiently suppress generation of $H_2S$. When the content of the active ingredient exceeds 11% by mass, the active ingredient may deteriorate the exhaust gas-purifying ability of the three-way catalytic component. More preferably, the range of the active ingredient content is 3.5 to 9.5% by mass. When the content of the active ingredient is set within this range, generation of $H_2S$ can be suppressed more effectively.

In the case where a three-way catalytic component and, when necessary, porous supports are contained in the catalyst, it is preferable that a content of precious metal in the washcoat falls within a range from 0.2% to 5% by mass and a content of the porous supports in the washcoat falls within a range from 60% to 97.3% by mass. More preferably, the content of the porous supports falls within a range from 80% to 97% by mass.

The catalysts can be manufactured by, for example, the following methods (i) to (iv).

(i) Porous supports, powder made of a water-insoluble solid compound of the above-mentioned rare-earth element and, when necessary, alumina zol are mixed into an aqueous solution of a precious metal nitrate to prepare a slurry. A substrate is coated with the slurry thus obtained and then dried, for example, at a temperature of 80 to 150° C. for 5 minutes to 2 hours. Then, the resultant structure is fired at 450 to 700° C. for 30 minutes to 3 hours. In this manner, the catalyst according to the first embodiment can be obtained.

(ii) Porous supports, and, when necessary, alumina zol are mixed into an aqueous solution of a precious metal nitrate to prepare a slurry. A section of a substrate from its upstream end to its middle, that is, an upstream section of the substrate is coated with the slurry thus obtained, and then dried. Next, Porous supports, powder made of a water-insoluble solid compound of a rare-earth metal and, when necessary, alumina zol are mixed into an aqueous solution of a precious metal nitrate to prepare another slurry. A section of the substrate from its downstream end to its middle, that is, a downstream section of the substrate is coated with the slurry thus obtained, and then dried. Then, the resultant structure is fired. In this manner, the catalyst according to the third embodiment can be obtained. The duration of drying, drying temperature, duration of firing, and firing temperature may be the same as those in the method (i).

(iii) Porous supports, and, when necessary, alumina zol are mixed into an aqueous solution of a precious metal nitrate to prepare a slurry. An entire substrate is coated with the slurry thus obtained, and then dried. After that, the resultant structure is fired. The duration of drying, drying temperature, duration of firing, and firing temperature may be the same as those in the method (i). Next, a section of the substrate from its downstream end to its middle, that is, a downstream section of the substrate is coated with a colloidal solution containing colloidal particles made of a water-insoluble solid compound of a rare-earth element, and then dried. In this manner, the catalyst according to the second embodiment can be obtained.

(iv) Porous supports, and, when necessary, alumina zol are mixed into an aqueous solution of a precious metal nitrate to prepare a slurry. An entire substrate is coated with the slurry thus obtained, and then dried. Subsequently, the resultant structure is fired. Next, the resultant structure is immersed in an aqueous solution of a water-soluble compound of a rare-earth metal, and then dried. After that, the resultant structure is fired. When the entire substrate is immersed in the aqueous solution of the water-soluble compound of the rare-earth metal, the catalyst according to the first embodiment can be obtained after drying and firing the structure. Alternatively, when only the downstream section of the substrate immersed in the aqueous solution of the water-soluble compound of the rare-earth metal, the catalyst according to the second embodiment can be obtained after drying and firing the structure. Examples of the water-soluble compound include a nitrate, sulfide, and chloride of the above-mentioned rare-earth metal. The duration of drying, drying temperature, duration of firing, and firing temperature may be the same as those in the method (i).

Examples of the present invention will now be described.

Examples 1 to 3 and Comparative Examples 1 to 3

Manufacture of Catalysts

Example 1

An aqueous solution of platinum nitrate containing 1 g of Pt, an aqueous solution of rhodium nitrate containing 0.2 g of Rh, 90 g of alumina, 52 g of cerium oxide, 10 g of neodymium oxide powder, and 100 g of alumina zol containing 10% by mass of alumina were mixed together to prepare a slurry A.

An entire monolith honeycomb substrate having a capacity of 1 L was coated with the slurry A, and dried at 150° C. for 1 hour. After that, the resultant structure was fired at 500° C. for 1 hour to obtain a monolith catalyst.

The monolith catalyst contained 1 g/L of Pt, 0.2 g/L of Rh, 100 g/L of alumina, 0.3 mol/L of Ce and 0.06 mol/L of Nd.

Example 2

An aqueous solution of platinum nitrate containing 1 g of Pt, an aqueous solution of rhodium nitrate containing 0.2 g of Rh, 90 g of alumina, 52 g of cerium oxide, and 100 g of alumina zol containing 10% by mass of alumina were mixed together to prepare a slurry B.

An upstream section of a monolith honeycomb substrate having a capacity of 1 L, which was the same as that used in Example 1, was coated with a half amount of the slurry B. Then, the resultant structure was dried at 150° C. for 1 hour. After that, a downstream section of the substrate was coated with a half amount of the slurry A described in Example 1. Then, the resultant structure was dried at 150° C. for 1 hour, and then was fired at 500° C. for 1 hour to obtain a monolith catalyst.

The upstream section of the monolith catalyst contained 1 g/L of Pt, 0.2 g/L of Rh, 100 g/L of alumina and 0.3 mol/L of Ce, and the downstream section of the monolith catalyst contained 1 g/L of Pt, 0.2 g/L of Rh, 100 g/L of alumina, 0.3 mol/L of Ce and 0.06 mol/L of Nd.

Example 3

An entire monolith honeycomb substrate having a capacity of 1 L, which was the same as that used in Example 1, was coated with the slurry B. The resultant structure was dried at 150° C. for 1 hour, and then was fired at 500° C. for 1 hour. A downstream section of the substrate was coated with a colloidal solution containing powder of neodymium oxide, and then was dried to obtain a monolith catalyst. It should be noted that the concentration of the neodymium oxide colloidal solution was adjusted so that the amount of Nd contained in the monolith catalyst was 0.06 mol/L. The upstream and downstream sections of the monolith catalyst were the same in composition as those of the monolith catalyst of Example 2, respectively.

Example 4

An entire monolith honeycomb substrate having a capacity of 1 L, which was the same as that used in Example 1, was coated with the slurry B. The resultant structure was dried at 150° C. for 1 hour, and then was fired at 500° C. for 1 hour. The structure was immersed in a neodymium nitrate solution, and was dried at 150° C. for 1 hour. After that, the resultant structure was fired at 500° C. for 1 hour to make the layer, which was formed on the substrate by using the slurry B, support neodymium. Thus, a monolith catalyst was obtained. It should be noted that the concentration of the neodymium nitrate solution was adjusted so that the amount of Nd contained in the monolith catalyst was 0.06 mol/L. The monolith catalyst was the same in composition as the catalyst of Example 1.

Comparative Example 1

An entire monolith honeycomb substrate having a capacity of 1 L, which was the same as that used in Example 1, was coated with the slurry B. The resultant structure was dried at 150° C. for 1 hour, and then was fired at 500° C. for 1 hour. Thus, a monolith catalyst was obtained.

The monolith catalyst contained 1 g/L of Pt, 0.2 g/L of Rh, 100 g/L of alumina and 0.3 mol/L of Ce.

Comparative Example 2

An aqueous solution of platinum nitrate containing 1 g of Pt, an aqueous solution of rhodium nitrate containing 0.2 g of Rh, 90 g of alumina, 52 g of cerium oxide, 4.5 g of nickel oxide, and 100 g of alumina zol containing 10% by mass of alumina were mixed together to prepare a slurry C.

An entire monolith honeycomb substrate having a capacity of 1 L, which was the same as that used in Example 1, was coated with the slurry C. The resultant structure was dried at 150° C. for 1 hour, and then was fired at 500° C. for 1 hour. Thus, a monolith catalyst was obtained.

The monolith catalyst contained 1 g/L of Pt, 0.2 g/L of Rh, 100 g/L of alumina, 0.3 mol/L of Ce and 0.06 mol/L of Ni.

Comparative Example 3

An aqueous solution of platinum nitrate containing 1 g of Pt, an aqueous solution of rhodium nitrate containing 0.2 g of Rh, 90 g of alumina, 62 g of cerium oxide doped with 17% by mass of $Nd_2O_3$, and 100 g of alumina zol containing 10% by mass of alumina were mixed together to prepare a slurry D. The Nd content of the cerium oxide used here was 14.6% by mass.

An entire monolith honeycomb substrate having a capacity of 1 L, which was the same as that used in Example 1, was coated with the slurry D. The resultant structure was dried at 150° C. for 1 hour, and then was fired at 500° C. for 1 hour. Thus, a monolith catalyst was obtained.

The monolith catalyst contained 1 g/L of Pt, 0.2 g/L of Rh, 100 g/L of alumina, 0.3 mol/L of Ce and 0.06 mol/L of Nd.

Measurement of $H_2S$ Emission

Figure 4:
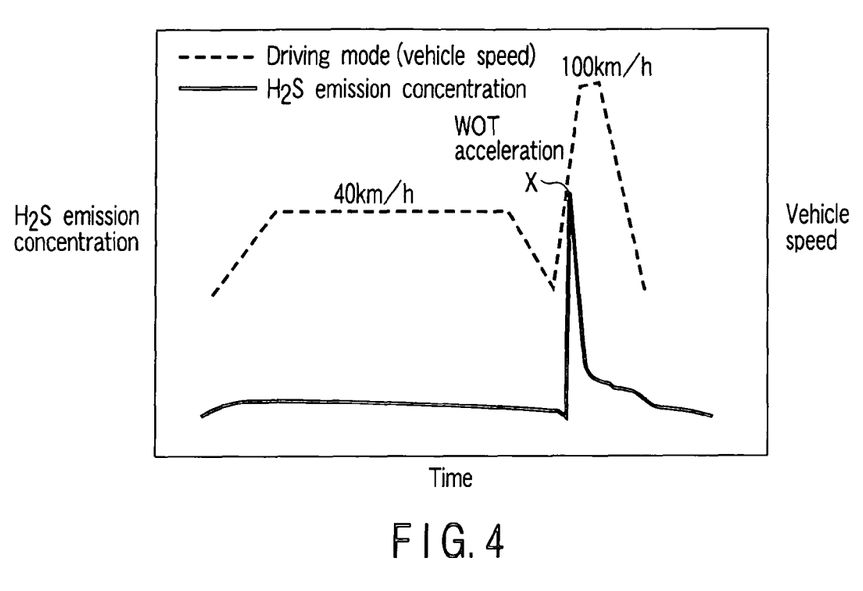
FIG. 4 is a graph showing an example of relationship between $H_2S$ emission concentration and a vehicle driving mode.
Figure 5:
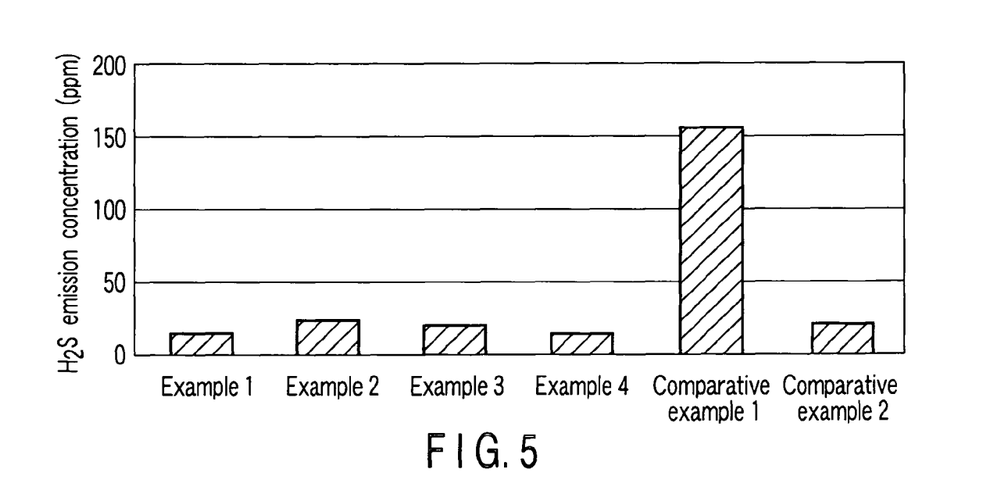
FIG. 5 is a bar graph showing $H_2S$ emission concentrations when the catalysts of Examples 1 to 4 and Comparative examples 1 and 2 are used.

The monolith catalysts of Examples 1 to 4 and Comparative examples 1 and 2 were mounted on automobiles each of which included an in-line four-cylinder engine having a piston displacement of 1.5 L. Each automobile was driven at the mode shown in FIG. 4, and the $H_2S$ emission concentration (ppm) in the exhaust gas at a peak of the $H_2S$ emission amount was measured. That is, the $H_2S$ emission concentration (ppm) was measured at the time indicated by point X in FIG. 4. Table 1 and FIG. 5 show the results. In FIG. 4, the ordinate denotes the driving mode (vehicle speed) and the $H_2S$ emission concentration, and the abscissa denotes the elapsed time. In this figure, a broken line represents the relationship between the vehicle speed and time, whereas a solid line represents the relationship between the $H_2S$ emission concentration and time. In FIG. 5, the bars represent data obtained for the monolithic catalysts of Examples 1 to 4 and Comparative examples 1 and 2, whereas the ordinate denotes the $H_2S$ emission concentration (ppm).

Evaluation of Purifying Performance

Each monolithic catalyst of Examples 1 to 4 and Comparative examples 1 and 2 was mounted to an exhaust system connected to an engine with a piston displacement of 4 L, and the engine was driven for 50 hours such that the exhaust gas at 800° C. entered the catalyst.

Figure 6:
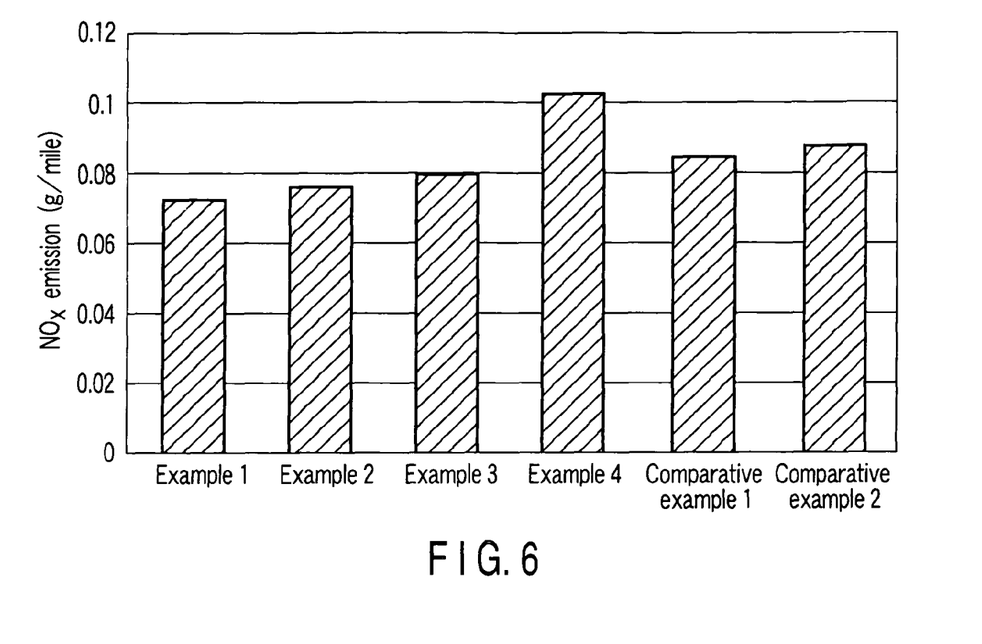
FIG. 6 is a bar graph showing amounts of $NO_x$ emission when the catalysts of Examples 1 to 4 and Comparative examples 1 and 2 are used.

After that, these catalysts were respectively mounted on actual vehicles each of which had an engine with a piston displacement of 2.2 L. Each of the vehicles was driven at the LA# 4 mode in compliance with the Federal Test Procedure FTP75, and the $NO_x$ emission (g/mile) was measured. Table 1 and FIG. 6 show the results. In FIG. 6, the bars represent data obtained for the monolithic catalysts of Examples 1 to 4 and Comparative examples 1 and 2, whereas the ordinate denotes the $NO_x$ emission (g/mile).

TABLE 1

|  | $H_2S$ emission concentration (ppm) | $NO_x$ emission (g/mile) |
| --- | --- | --- |
| Example 1 | 14 | 0.072 |
| Example 2 | 23 | 0.076 |
| Example 3 | 21 | 0.079 |
| Example 4 | 13 | 0.102 |
| Comparative example 1 | 156 | 0.085 |
| Comparative example 2 | 21 | 0.088 |

As shown in Table 1 and FIG. 5, when the monolithic catalysts of Examples 1 to 4 were used, the $H_2S$ emission concentration could be reduced to a level almost equal to or lower than that in the case where the monolithic catalyst of Comparative example 2 containing Ni was used.

In the case where the monolithic catalyst of Comparative example 1 that did not contain Nd and Pr was used, the $H_2S$ emission amount was much larger as compared to the cases where the monolithic catalysts of Examples 1 to 4 were used.

Further, as shown in Table 1 and FIG. 6, the monolithic catalysts of Examples 1 to 4 achieved a low $NO_x$ emission, and compared favorably in exhaust gas-purifying performance with the monolithic catalysts of Comparative examples 1 and 2. In particular, the monolithic catalysts of Examples 1 to 3, which used neodymium oxide powder as the powder made of the water-insoluble solid compound of the rare-earth element, achieved a lower $NO_x$ emission as compared to the monolithic catalysts of Comparative examples 1 and 2. That is, the monolithic catalysts of Examples 1 to 3 were particularly excellent in the exhaust gas-purifying performance as compared to the monolithic catalysts of Comparative example 1 and 2. The reason for this is considered that the thermal degradation of the catalyst due to, for example, generation of aluminate could be avoided by using the powder made of the water-insoluble solid compound of the rare-earth element.

Measurement of $H_2S$ Emission

Figure 7:
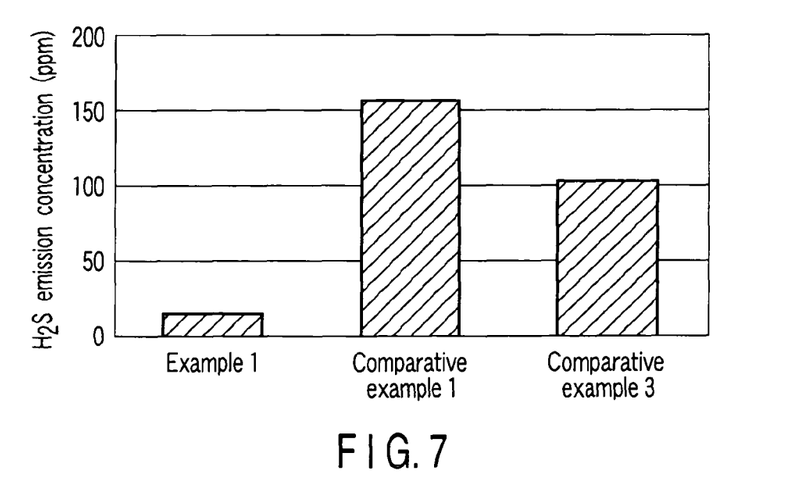
FIG. 7 is a bar graph showing $H_2S$ emission concentrations when the catalysts of Example 1 and Comparative examples 1 and 3 are used.

With use of the monolithic catalysts of Example 1 and Comparative examples 1 and 3, the $H_2S$ emission amount was measured by the same method as described above. Table 2 and FIG. 7 show the results. In FIG. 7, the bars represent data obtained for the monolithic catalysts of Example 1 and Comparative example 1 and 3, whereas the ordinate denotes the $H_2S$ emission concentration (ppm).

TABLE 2

|  | $H_2S$ emission concentration (ppm) |
| --- | --- |
| Example 1 | 14 |
| Comparative example 1 | 156 |
| Comparative example 3 | 104 |

As shown in Table 2 and FIG. 7, when the monolithic catalyst of Example 1 was used, the $H_2S$ emission amount could be reduced to a level lower than that in the case where the monolithic catalyst of Comparative example 1 that did not contain Nd and Pr was used. Further, when the monolithic catalyst of Example 1 was used, the $H_2S$ emission amount could be reduced to a level lower than that in the case where the monolithic catalyst of Comparative example 3 was used. This is because the cerium oxide used for Comparative example 3 did not contain Nd as the main component so that Nd in the obtained catalyst did not function as an active ingredient. In the catalyst of Comparative example 3, Nd was a dopant contained in the cerium oxide. By contrast, in the catalyst of Example 1, Nd was supported on alumina, cerium oxide or the substrate. With this structure, in the catalyst of Example 1, Nd functioned effectively as an active ingredient.

Examples 5 to 9

Manufacture of Monolith Catalysts

Examples 5 to 7

In each of these examples, a monolith catalyst was manufactured in the same manner as that of Example 1 except that the content of neodymium oxide in the slurry A was changed variously.

The Nd content (mol/L) and $Nd_2O_3$ content (% by mass) of each monolith catalyst thus obtained are shown in Table 3.

Examples 8 and 9

In each of these examples, a monolith catalyst was manufactured in the same manner as that of Example 1 except that praseodymium oxide, in place of neodymium oxide, was added to the slurry A, and the content thereof was changed variously.

The Pr content (mol/L) and $Pr_6O_{11}$ content (% by mass) of each monolith catalyst thus obtained are shown in Table 3.

Measurement of $H_2S$ Emission

Figure 8:
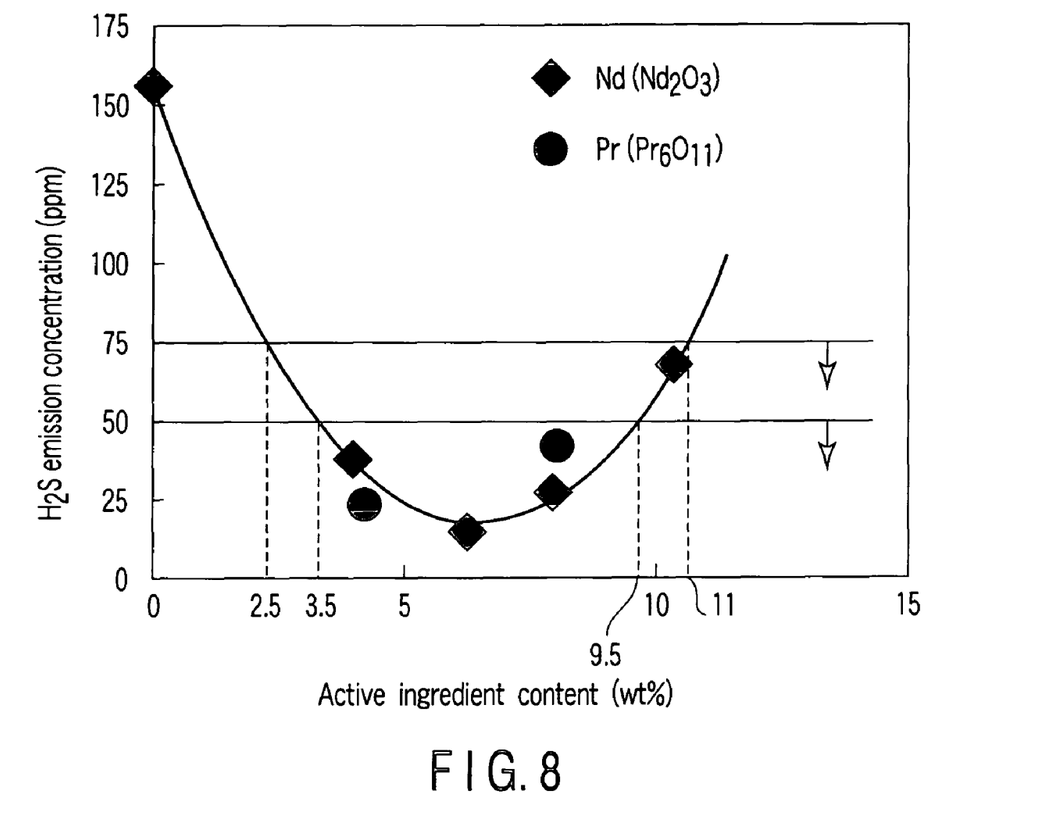
FIG. 8 is a graph showing a relationship between the $H_2S$ emission concentration and active ingredient content.

With use of the monolith catalysts of Examples 1, 5 to 9 and Comparative example 1, the $H_2S$ emission amount was measured in the same manner as that described above. Table 3 and FIG. 8 show the results. In FIG. 8, the abscissa denotes the active ingredients ($Nd_2O_3$, $Pr_6O_{11}$) contents (mass %) of the catalyst used, whereas the ordinate denotes the $H_2S$ emission concentration (ppm).

TABLE 3

|  | Active ingredient content | | | | $H_2S$ emission concentration (ppm) |
| --- | --- | --- | --- | --- | --- |
|  | Nd (mol/L) | $Nd_2O_3$ (mass %) | Pr (mol/L) | $Pr_6O_{11}$ (mass %) |  |
| Example 1 | 0.06 | 6.2 | — | — | 14 |
| Example 5 | 0.05 | 4 | — | — | 38 |
| Example 6 | 0.1 | 7.9 | — | — | 28 |
| Example 7 | 0.2 | 10.3 | — | — | 68 |
| Example 8 | — | — | 0.05 | 4.2 | 23 |
| Example 9 | — | — | 0.1 | 8 | 42 |
| Comparative example 1 | 0 | 0 | 0 | 0 | 156 |

As shown in Table 3 and FIG. 8, when the monolith catalysts of Examples 1 and 5 to 9 were used, the $H_2S$ emission amount could be reduced to a level lower than that in the case where the monolith catalyst of Comparative example 1, which did not contain Nd and Pr, was used. Further, from FIG. 8, it was confirmed that the effect of reducing the $H_2S$ emission amount could be improved especially when the active ingredient content of the catalyst was set within a range of 2.5 to 11% by mass. In particular, it was confirmed that when the active ingredient content of the catalyst was set within a range of 3.5 to 9.5% by mass, the effect of reducing the $H_2S$ emission amount could be further improved.

According to the above technique, it is possible to reduce $H_2S$ emission without using Ni and significantly deteriorating the exhaust gas-purifying ability when a three-way catalytic component containing a precious metal is used.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An exhaust gas-purifying catalyst comprising:
   a monolith honeycomb substrate including an upstream section and a downstream section;
   an active ingredient that suppresses generation of hydrogen sulfide, the active ingredient including at least one rare-earth element selected from the group consisting of Nd and Pr; and
   a precious metal,
   wherein the upstream section of the substrate supports the precious metal and the downstream section of the substrate supports the active ingredient, and the active ingredient is in a form of powder made of a water-insoluble solid compound of the rare-earth element.

2. The catalyst according to claim 1, wherein the active ingredient is contained at a ratio falling within a range from 2.5% to 11% by mass.

3. The catalyst according to claim 1, further comprising a porous support supporting the active ingredient.

4. The catalyst according to claim 1, further comprising a porous support supporting the active ingredient and containing at least one of alumina and ceria.

5. The catalyst according to claim 1, wherein the precious metal is at least one selected from the group consisting of Pt, Rh and Pd.

6. The catalyst according to claim 1, wherein the catalyst is free of Ni.

7. An exhaust gas-purifying catalyst comprising:
   a monolith honeycomb substrate including an upstream section and a downstream section;
   an active ingredient that suppresses generation of hydrogen sulfide, the active ingredient including at least one rare-earth element selected from the group consisting of Nd and Pr; and
   a precious metal,
   wherein the upstream section of the substrate supports the precious metal and the downstream section of the substrate supports the active ingredient, and the active ingredient includes a composite oxide containing the rare-earth element.

8. The catalyst according to claim 7, wherein the composite oxide contains the rare-earth element at a ratio falling within a range from 30% to 80% by mass.

9. The catalyst according to claim 7, wherein the active ingredient is contained at a ratio falling within a range from 2.5% to 11% by mass.

10. The catalyst according to claim 7, further comprising a porous support supporting the active ingredient.

11. The catalyst according to claim 7, further comprising a porous support supporting the active ingredient and containing at least one of alumina and ceria.

12. The catalyst according to claim 7, wherein the precious metal is at least one selected from the group consisting of Pt, Rh and Pd.

13. The catalyst according to claim 7, wherein the catalyst is free of Ni.

* * * * *